(12) United States Patent
Zuleeg

(10) Patent No.: US 8,573,475 B2
(45) Date of Patent: Nov. 5, 2013

(54) ZULU NUMBERS FOR OBJECT IDENTIFICATION AND ENHANCEMENT

(76) Inventor: Christopher Rainer Zuleeg, Saratoga, CA (US)

( * ) Notice: Subject to any disclaimer, the term of this patent is extended or adjusted under 35 U.S.C. 154(b) by 0 days.

(21) Appl. No.: 13/426,072

(22) Filed: Mar. 21, 2012

(65) Prior Publication Data
US 2012/0241516 A1    Sep. 27, 2012

(51) Int. Cl.
*G06F 17/00*    (2006.01)
(52) U.S. Cl.
USPC .......................................... 235/375; 235/487
(58) Field of Classification Search
USPC .................................. 235/375, 454, 494, 487
See application file for complete search history.

(56) References Cited

U.S. PATENT DOCUMENTS

| | | | |
|---|---|---|---|
| 2007/0175974 A1* | 8/2007 | Self et al. | 235/375 |
| 2010/0166309 A1* | 7/2010 | Hull et al. | 382/176 |
| 2011/0101115 A1* | 5/2011 | Rampersad | 235/494 |
| 2011/0137890 A1* | 6/2011 | Bestgen et al. | 707/719 |

* cited by examiner

*Primary Examiner* — Edwyn Labaze
(74) *Attorney, Agent, or Firm* — Law Office Dorian Cartwright

(57) ABSTRACT

A zulu number, discerned from a QR code, is received from a client. A database is accessed to retrieve enhanced information associated with the zulu number and store information from the client. The enhanced information is sent to the client for display or execution.

12 Claims, 4 Drawing Sheets

ZULU NUMBERS FOR OBJECT IDENTIFICATION AND ENHANCEMENT

CROSS-REFERENCE TO RELATED APPLICATIONS

This application claims priority under 35 USC 119(e) to U.S. App. No. 61/466,247, by Chris Zuleeg, filed on Mar. 22, 2011, entitled ZULU NUMBERS FOR OBJECT IDENTIFICATION AND ENHANCEMENT, and to U.S. App. No. 61/468,500, by Chris Zuleeg, filed on Mar. 28, 2011, entitled TRANSPORTING OBJECTS USING ZULU SPICE, the entire contents of each being hereby incorporated by reference in their entirety.

BACKGROUND

1. Technical Field

Embodiments of the invention relate generally to object identification, and more specifically, to using ZuluNumbers to identify and enhance objects.

2. Prior Art

Objects can be physical or virtual. Physical objects include commercial products, warehouse inventory, personal items, and the like. Virtual objects include magazine advertisements, online objects, events, experiences, and more.

Currently, objects are identified by, for example, bar codes, serial numbers, and descriptions. However, bar codes typically identify a type of object rather than a specific instance of an object. Although serial numbers identify a specific object, the text characters are not inherently available for machine reading or scanning. Furthermore, there is no universal format for bar codes and serial numbers across various types of objects. Moreover, descriptions of objects are static and cannot be updated on objects such as magazine advertisements that have already been published and distributed.

Additionally, many objects are generic, especially when mass produced. Consequentially, it is not possible to tailor information about an object for a particular person or context. Nor can the information be updated based on information that becomes available after distribution of an object.

What is needed is to uniquely identify disparate objects with a universal format. Further, information associated with objects should be dynamic and/or customizable.

BRIEF DESCRIPTION OF THE FIGURES

In the following drawings like reference numbers are used to refer to like elements. Although the following figures depict various examples of the invention, the invention is not limited to the examples depicted in the figures.

FIG. 2A is a flow chart illustrating a method for routing for a cooperative transfer of physical objects over the network, according to an embodiment of the present invention.

DETAILED DESCRIPTION

Part I

The above-mentioned needs are met by a method, system and computer program product for object identification and enhancement. The following detailed description is intended to provide example implementations to one of ordinary skill in the art, and is not intended to limit the invention to the explicit disclosure, as one or ordinary skill in the art will understand that variations can be substituted that are within the scope of the invention as described.

Objects can be physical or virtual. Physical objects include, for example, commercial products, warehouse inventory, personal items, trees, pets, real estate, automobiles, mail, and the like. Virtual objects include, for example, magazine advertisements, online objects, events, experiences, dates, emotions, and the like. An object can be identified using a unique ZuluNumber.

Figure 1:
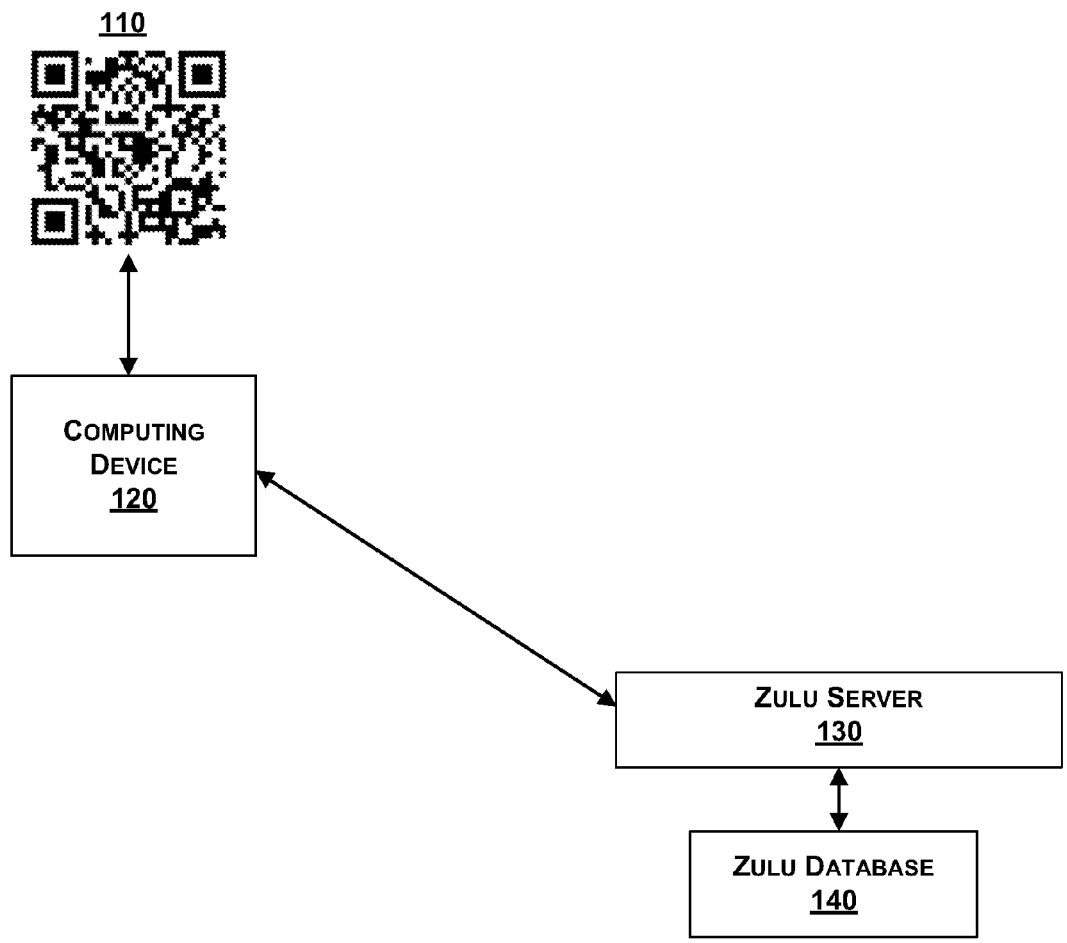
FIG. 1 is a block diagram illustrating system for object identification and enhancement according to an embodiment of the present invention.

FIG. 1 is a block diagram illustrating an exemplary system 100 for object identification and enhancement, according to one embodiment. The system 100 can implement embodiments described in detail below.

One or more ZuluNumbers can be embedded in a QR (Quick Response) Code 110 as shown, or in an alternative machine-readable format. A computing device 120 can be a smart phone or other mobile or stationary processing device, capable of reading the QR Code 110. A Zulu server 130 can be a network-based server in communication over a network (e.g., data or cellular network) with the computing device 120. A Zulu database 140 is accessible by the Zulu server 130 either locally or remote. In one embodiment, the Zulu database 140 stores information associated with a set of QR Codes including QR Code 110. The stored information can be indexed according to a ZuluNumber and be associated with data, multimedia, documents, URLs, source code, commands, or any other type of information described in the implementations below. In one embodiment, the stored information is preloaded into the Zulu database 140. In another embodiment, the stored information is stored by the computing device 120.

Figure 2:
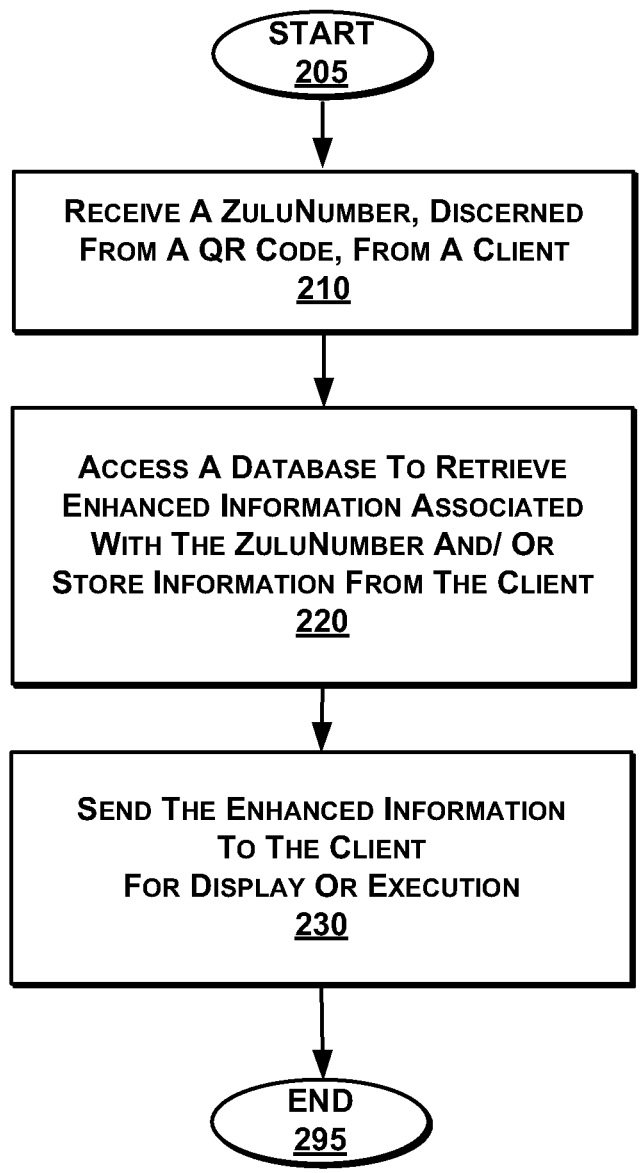
FIG. 2 is a flow chart illustrating a method for object identification and enhancement according to an embodiment of the present invention.
Figure 2:
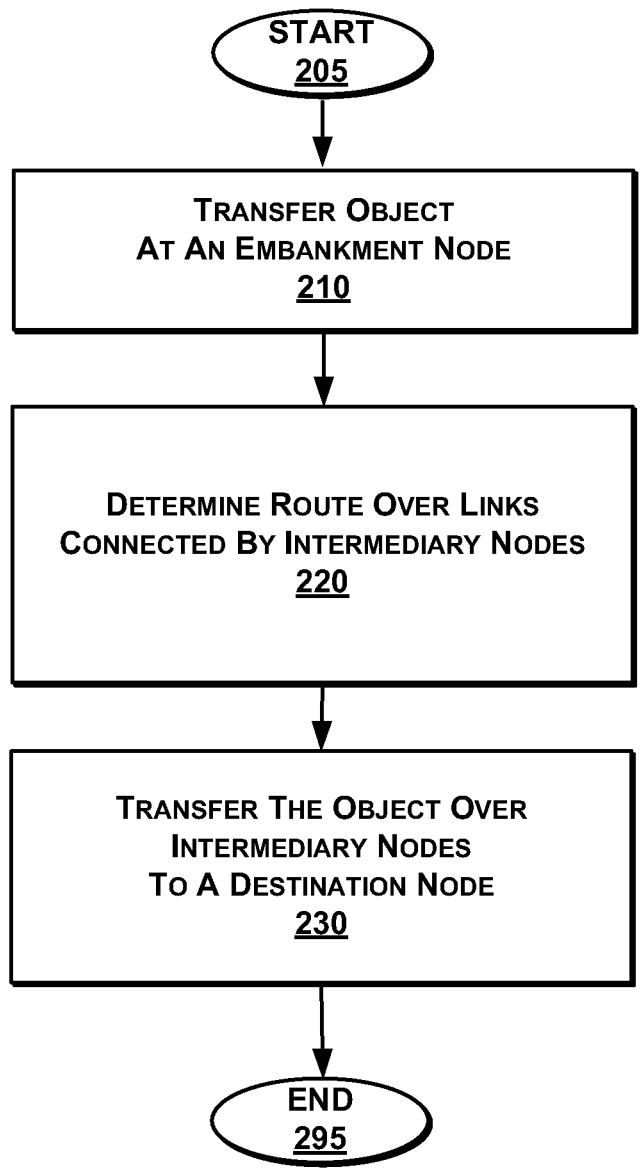

FIG. 2 is a flow chart illustrating an exemplary method 200 for object identification and enhancement, according to one embodiment. The method 200 can be implemented in, for example, the Zulu server 130 of FIG. 1.

At step 210, a ZuluNumber is received from a client and discerned from, for example, a QR Code. At step 220, a database is accessed to retrieve enhanced information associated with the ZuluNumber, as described in more detail below. At step 230, the enhanced information is sent to the client for display to a user. In some embodiments, data from the client is stored in a database in association with the ZuluNumber. In another embodiment, the enhanced information is executed (e.g., an application).

In one example, a user can scan a QR Code with a smart phone at the entrance of a house for sale. A ZuluNumber associated with the property is embedded in the QR Code. In response, audio for a guided tour can automatically start to play. Additionally, a browser window can automatically display price and other parameters.

Several more detailed applications of ZuluNumbers are presented below. In some embodiments, these applications can be implemented using the general architecture described above. In other embodiments, the architecture can be varied as needed.

ZuluNumbers

In one embodiment, ZuluNumbers are unique identifiers that can identify everything—all the people, places and things on the planet. ZuluNumbers are an extension of UPC or ISBN bar codes, but what makes them inventive is that they identify specific objects rather that groups of products. Additionally, while UPC or ISBN barcodes are static, ZuluNumbers are dynamic and can have associated actions. In one example, they are 16 characters of the format ZabcDEF1234567890 where each character (other than the preceding identifying "Z") is a base 62 digit comprised of alpha a-z, A-Z and numeric 0-9. 16 characters of base 62 can identify $4.77 \times 10^{28}$ unique items, or about $6.81 \times 10^{18}$ ZuluNumbers for every person on Earth. Other embodiments of ZuluNumbers could be more or less than 16 characters, or include other characters than a-z, A-Z and 0-9. What is practical about 16 characters a-z, A-Z and 0-9 is that it is long enough to specify many unique objects, short enough to remember or to type in manually, if required, and are also able to be typed into an ordinary (non-keyboard) cell phone. ZuluNumbers are a simple and fundamental underlying technology. Following are some characteristics of ZuluNumbers and some examples of their practical application.

ZuluNumber Characteristics

ZuluNumbers are globally unique strings, e.g. Z3hG5F6 kd9fj53b3g, which are stored in the ZuluNumber database. Each ZuluNumber has an owner and only the owner can modify the data or specify the Access Privileges to that data, e.g. to the Public, Private, or to Friends and Family, or to specify the purpose, application or disposition of that ZuluNumber or its data. For instance, the owner might specify a ZuluNumber to be a Voice Annotation ZuluNumber to the Public, contain private data only available to the owner, and share a subset of that data with their Friends and Family. ZuluNumber data would have specific static fields shared across all ZuluNumbers (e.g. owned vs. available, voice vs. data, weight, height, length, width, value, color, cost, location), but other data would be stored in XML to dynamically allow new fields to be created and stored. ZuluNumbers can be identified by QR_Code to store more dense information and to provide error correction. However, fundamentally, the ZuluNumber service guarantees that the requestor of the ZuluNumber information will be provided that information by whatever method possible, whether through smart phone, telephone, web page, post card, or even in person. ZuluNumbers can be easily read with your camera enabled smart phone. GoogleGoogles or simple Barcode reading apps allow you to read in the ZuluNumber, which takes you directly to the ZuluNumber website where the publicly available data will be retrieved from the ZuluNumber database and be acted upon, e.g. either displayed or the voice annotation be played. When accessed anonymously with just a QR_Code reader, your IP address, smart phone's MAC address, your inferred location and time would all be stored with the ZuluNumber itself in a transaction log. A ZuluNumber App would include your identity and could also allow you to further tailor your experience, for instance to create a log of all the ZuluNumbers you have scanned, or to turn off Voice Annotation in case you are a work environment. If you opt-in to share your identity and location and allowing this data to be sent to the ZuluNumber website, many more possibilities are enabled as outlined below. For instance, you can visit your personal ZuluNumber web page at a later time to see which ZuluNumbers you have scanned and where you were and when you scanned them. If they are your ZuluNumbers, you can update your ZuluNumber information and also see who has scanned your ZuluNumbers. ZuluNumbers can also be stored on RFID chips, and attachments can be added to your cell phone (or at some point they might even become an embedded feature of cell phones) to eliminate the need to physically scan the barcode or QR_Code. This enables an entirely new set of applications, outlined below.

ZuluNumber General Implementations

In another example, ZuluNumbers can be used of advertise on all pages for revenue. Monetize everything and track profitability. Set up sites with CC, bill, or credit monthly. Create new currency called ZuluPoints that you can buy, sell or earn (to avoid being a bank). Buy with money, earn by capturing and sharing RFID ZuluNumber GeoLocation data, get paid by converting ZuluPoints into money or buying special deals (like what Discover Card does with earned Discover Points). Use ZuluPoints to pay for Customer Support calls. Publish maps (like Verizon's Red/Blue coverage maps) to show "Dead Spots" or "Hot Spots" where no recent RFID ZuluNumber data was collected. Go to those places to earn the most ZuluPoints. Can set up the ZuluApp to tell you whenever you have collected enough data to earn another ZuluPoint. ZuluApp tells you when you have located an object that has been registered as lost or stolen and carries a reward. "ZooooluNumba—You are near a w-a-l-l-e-t that has been lost and which carries a F-i-f-t-y dollar reward. Would you like me to help you find it?". You get the reward, we get 30%. Mark both public, friends, and private areas of ZuluNumber information. Partner with Delicious Library to organize your home inventory. Spawn cottage industries (ala eBay)—Aggregators—Buy, store, group like objects, sell sets for more (e.g. 3 plates+9 plates=1 dozen set). Combinators—Buy, store, pair items, sell for more (e.g. #4, #6, #8 Phillips screw drivers=a set). ZuluNumber Jewelry—ZuluNumber charms in gold or silver. ZuluNumber for Postal Delivery automation. RFID ZuluNumbers for lift tickets or for Trathlons/10Ks—to get your splits and times. Use QR Barcodes for ZuluNumbers to embed more information in them and to improve reading times and resiliency to damage. Set up alerts so that when a ZuluNumber stops reporting, the owner is alerted that it is damaged or stolen. Arrange to have it replaced for ZuluPoint fee. Use ZuluNumbers for ZuluNumbers, Inc. asset tags!

ZuluNumber Pricing

Commercial: 0.05
Non-Profit: 0.01+0.01/1000 scans
Personal Use: 0.02+Unlimited
Education 0.01+Unlimited
Research: 0.01+Unlimited
Extra cost for geotracking.
Limit Voice to 5 seconds, 0.01 per additional 10 seconds
Sell Geo info upon your approval to earn ZuluPoints ZuluNumber Voice Annotation This could be a fun and potentially viral first way to promote ZuluNumbers. ZuluNumbers have voice annotations associated with them. For example, your own voice (if you use a phone, you just talk into it), or text-to-speech, or music, or an actual advertisement. The ZuluNumber can specify to play the sound annotation as the default action to take upon being scanned. Users can configure to allow/disallow/prefer sound annotation (to avoid embarrassing situations, e.g. making sounds at a meeting) (especially when used in conjunction with RFID ZuluNumbers when you might not be able to control when you actually detect or read the ZuluNumber). Practical applications: ZuluNumbers on Real Estate signs, to describe the home generally. Use it within homes at open houses to describe individual rooms. Use it in museums to describe paintings or sculptures. Use it at restaurants to describe meals. Use it outside of restaurants to describe the fare and the ambiance. Use it in magazines or newspapers to voice annotate ads—and once you scan it, it's added to your "Scanned ZuluNumber" page on your ZuluNumber site—where you can find out more, or get a coupon—and in addition, the vendor knows how many, who, and where from the ad was read or you had expressed interest in their product. Use it to advertise that this ZuluNumber is for sale. Use it on Vanity ZuluNumbers (e.g. ZEifelTower000000, ZGoldenGateBridge) to say whatever you want. Put it on TV or YouTube ads. Put it on greeting cards with your own message. Create ZuluNumber Facebook pages to publish who scanned it and when. The possibilities are virtually endless. Maybe for the magazine ads, charge the owner of the ZuluNumber for each scan since transmitting voice or even video annotation could prove to be quite costly, both in bandwidth for the transmission but also in storage. Might need to limit the size or limit the number of downloads to the pre-purchased amount. Use it for sweepstakes—The 100th scanner gets a free iPad or whatever.

ZuluNumber GeoLocation

In still another example, a system can use ZuluNumbers to track location of objects (and/or people). You could calculate distance traveled, velocity (max and average), elevation climbed and descended (like how Garmin does it for your workouts). For instance, you can put an RFID ZuluNumber on your mountain bike, carry your cell phone with you, and then when you go to the ZuluNumber web page for that ZuluNumber, it can tell you the stats. It can aggregate the data and tell you how far you've ridden your bike in a week, a month, a year, or since you've owned your bike. To track your running, just put a ZuluNumber RFID on your running shoes. You can also opt-in to have this data be shared with companies like Groupon who would love to know where you are, when and on what days of the week in order to fine tune Groupon deals. This latter application would aggregate your RFID ZuluNumber data feed, using your phone home information to track your time/location rather than to track the time/location of the object itself.

LWHWB Catalog

Cataloging common items by their Length, Width, Height, Weight and Barcode data. Basically, once these 5 characteristics are collected, a vast majority of commonly occurring items in our daily lives can be uniquely identified. First, the Barcode, if available, can uniquely identify the item by looking it up in the generally available UPC (http://www.upcdatabase.com/itemform.asp) Or ISBN (http://isbndb.com/) databases. If a standard barcode is not available or is obscured/damaged, then Length, Width, Height and Weight can be used as a hash into a global catalog to narrow the guess down to one or only a few different potential items. LWHWB cataloging is another key component to some other ideas (below). LWHWB data is associated with the ZuluNumber for that specific object.

HIS/HERS

Home Inventory System/Home Excess Reduction System—Through the use of simple machinery and eventually robotics, common household/business items are organized and cataloged. Items are placed in common 10 gallon tubs, and items are scanned for Barcode or ZuluNumber, and if found, then they are identified. Failing that, the items have their Length, Width, Height and Weight measured and they are digitally photographed from 3 sides (during Length, Width and Height measurements) and the user is presented with a list of potential items that this item could be. Additionally, a video can be made of the object while it is being manipulated and stored with the object's ZuluNumber. Once selected, the item is provided with a ZuluNumber that will permanently identify this item in the future, simplifying future inventories. The user is presented with some questions they can answer, like is this new or used, is it valuable memorabilia, how often might it need to be accessed, etc. This information can be used in other ideas (below). When you want to find something, all you need to do is look to your HIS/HERS database (it could be very similar to how iTunes organizes your music today, only this is for items instead of music). It can either tell you exactly in which bin it is located and you can "check it out" (e.g. tell the system you are using it) and go get it. And then remember to "check it back in" and put it back in the same place when you are done. See "Z-Spot" for automated ways to get the item delivered to you.

Online Video Robotics—3D Item Video Viewing

The video of the object being manipulated in the HIS/HERS system could be used on eBay, Amazon, or wherever items (particularly used items) are bought and sold, and played back to allow the user to view the object. However, the user might want to view the object from different angles in real time. Since HIS/HERS has a robot that can manipulate an item to take photos and video of it, why not allow that robot be controlled by a remote user and have the item be captured on video real time? A user could "reserve" to have an item viewed at some point in time in the future (say 10 minutes) which provides enough time for the item to be brought from inventory into a viewing robot. The end user can then manipulate and view the object live. Alternately, if the object was already previously viewed and manipulated, that video (or YouTube) of the past viewing can be played back instantaneously (without a reservation), since what one person would want to do to manipulate and view the object is probably similar to what the next person would want. All the images and videos of an object are stored with the object's ZuluNumber. The owner of the object itself could request to "have another look" at the object they have in inventory without having to physically retrieve it, which is particularly useful if the object is stored remotely. You can virtually "always take a look at what you've got".

Z-Spot

A place where you can put your stuff and they just "go away" (but you can always get them back when you want them). It works with the HIS/HERS system (above) only it is a special spot (the Z-Spot) where you can place the object. It gets drawn away (with robotics, conveyor belts or other physical transport). The item is scanned and measured for LWHWB. If it is new, it goes through the same steps as in HIS/HERS above. You can also use the "Z-Spot" to request that the item be brought to you. When you look something up that you'd like, and you don't want to physically go to that storage bin, you can request that the item be retrieved for you. This automates the "check in/check out" process. The benefit (beyond not having to physically retrieve the item) is that now the HIS/HERS system can track just how frequently you use certain items. Items that are rarely used can be put into further back, slower accessed, bulk storage (where perhaps many items would be stored in one bin). More frequently used items could be put into smaller containers (one item per container), like an "item cache" for quick and frequent access. Think of it like a memory storage system where often used data is stored in RAM cache, less frequently used files are stored on disk, and archived items are placed on tape, only it is for objects and not data. Here would be a typical use scenario. You come home and you put your wallet, keys and badge on the Z-Spot. They go away, but are placed in short term, high frequency, high access storage. You ask for them back and they reappear almost instantaneously. You could even have it programmed to have them appear at 8 AM each weekday morning to greet you as you are about to leave to work. Other items less frequently used (e.g. screwdrivers) could be stored in medium term storage, that might take a few minutes to retrieve. You could even specify a set of tools required for a particular job (or it could remember which tools you used for a particular job) and all those tools could be retrieved as a set (think of it like a playlist in iTunes). Finally, with all this usage data, the system can now suggest to you excess items that you have which it could either rent to friends (or anyone) or sell on eBay for you. It would look up the average selling price and then give you 60% of that value, and it would just "go away" and you'd get the money. Another way to use HIS/HERS is to identify the total value of all these items (by looking up their average selling price on eBay) and for cataloging items for insurance purposes (in the case of a fire—to determine replacement value).

HIS/HERS keeps track of what you use and how often. It can suggest when you have something that you don't use and offer to sell it on eBay. It can find duplicates (e.g. you have 6 Phillips head screw drivers—since you could never find them before, you kept buying them). Now that you're organized, it can suggest that the excess inventory be sold on eBay.

Friends can use their trusted networks (like Facebook or LinkedIn) and share with friends what they have. If you need something but don't have it, you can see who you know who does have it. Or friends of friends who have it, etc. Once you determine where the item is, you can ask to borrow it. Maybe for free, maybe buy it, maybe rent it for a small fee.

People could virtually put all kinds of things that they don't use into the system and then instead of having inventory sitting there doing nothing, those items could simply migrate around to wherever they are needed and generate a revenue stream by renting them to people.

You can organize your things any way you want: alphabetically, by usage frequency, by type (e.g. tools, books, etc.), or in fact by any of the characteristics stored about that item either entered by the user or from a database of characteristics compiled about that object. In the case where people might physically go to the bins to get and put back items (e.g. homes without a Z-Spot), the system can be programmed to periodically run through all the inventory to identify what have made their way into the bins, got put into the wrong bin, or which were not yet returned, and update the inventory database accordingly. This can occur slowly at night by some predetermined schedule or once the system reasonably might believe that the inventory data has gotten stale.

There are also variations which use RFID to identify the correct bin. These would be special passive RFID tags that would be placed on bins and would have a ZuluNumber associated with them. There are already hand held units which play a game of "hotter, cooler" with beeps which help you locate the correct bin. See MicroRFID below.

RFID ZuluNumbers can be used another way as well. If it became worthwhile for GPS Cell Phones to have low cost RFID readers in them (or if inexpensive RFID readers could be produced, like the Square Credit Card reader that fits into the iPhone's microphone port), then they could virtually always be able to tell what RFID ZuluNumber item they are near, and where those RFID ZuluNumber items are located. To make it worthwhile, people would get paid for this data. Each unique RFID ZuluNumber identification could be worth 0.0001 to ZuluNumbers, Inc. ZuluNumbers could pay 0.00007 per identification (ZuluNumbers makes 30% by arbitrage). Hence, for every 130 items you identify their location, you get a penny. You might encounter 130 or even 260 unique items in a day, earning you 1-2 cents a day, or 30-60 cents a month. You don't have to do anything to earn this, just carry your RFID enabled ZuluNumber phone with you. A lower cost alternative is to not use RFID but instead to simply have a bar code reader in your phone. The net result is the same, only you need to bar code read any ZuluNumber you happen to encounter in a day. Obviously, you can earn more with RFID, but there probably won't be as many RFID ZuluNumbers in circulation since they still cost about 0.25 to make them—which is prohibitive for most of the items they might identify.

ZuluNumbers can have the added benefit of locating items you have lost, or to identify the whereabouts of an item which you have ZuluNumber labeled. Say for instance you ZuluNumber labeled your digital camera. Your camera could be found by a good soul and be ZuluNumber scanned. You would be charged a finder's fee for the return of your camera, say $30, and ZuluNumber gets a 30% share of that finders fee, or $9. That's one way in which ZuluNumbers can make the money it needs to pay people for the bar code ZuluNumber information they scan in or the RFID ZuluNumbers they encounter in their daily lives.

ZuluNumbers also have ownership and data associated with them. Each ZuluNumber has data associated with them which are always available to user through a web browser. The data can be read by anyone (unless it is specified as private), and can be modified only by the owner. The data is XML and it specifies the owner, what the item is, or anything else you might want to put into that data. If it's a part of someone's HIS/HERS system, it might specify the rental cost and availability.

ZuluNumbers cost money to own. They cost about 0.01 per year per ZuluNumber. But people may be willing to pay this if it enables HIS/HERS and the whole idea of renting your items, or to have your items go to friends or even strangers. It helps keep track globally of your unique item.

ZuluNumbers could have a secondary market, just like Web URLs today (aka GoDaddy). Since they are Alphanumeric, they can form names like ZChrisZuleeg01234, or any one of a number of names, trademarks, marketing slogans, etc. There would even be ones with your SSN, like ZSocSecN123456789. These Vanity ZuluNumbers can be bought and sold through the ZuluNumber.com website. You can request vanity ZuluNumbers and buy them at a higher rate, say 0.05 and 0.05 per year. You can try to sell them by any marketing scheme you'd like (eBay?). Whenever ownership is transferred, ZuluNumber.com gets 30% of the transaction fee. Some Vanity ZuluNumbers may even go for 10s or 100s of dollars! You can request blocks of "non-vanity" ZuluNumbers for you own home use, or they will be generated for your use. Some might look ugly (Z5Hd8EmFsdj5garY8), but that's fine if all they'll do is be scanned automatically to identify the item. ZuluNumber.com will probably reserve a large number of ZuluNumbers that can be sold on the secondary market. SSNs might need to be reserved and provided to their rightful owners at a low enough cost. ZuluNumbers may even be phone numbers that could drive traffic to a business. ZuluNumbers are a very simple idea that can have many benefits. All ZuluNumber.com strives to provide is a service to manage the ZuluNumbers and to deliver the "value" (e.g. the data associated with them) and people figure out what to do with them to make them useful for them. For instance, items bought and sold a garage sale could have ZuluNumbers on them. The ZuluNumber virtually comes with the item, helping identify and track it. When you buy the item, you get the ZuluNumber. You now register yourself as the new owner of that item (since it's now put into your HIS/HERS system) and you now need to pay the 0.01 per year for that item's ZuluNumber. If you don't want to, then the ZuluNumber is de-activated and rendered useless, but it is put on the "retired ZuluNumber" list so as not to be re-used and confused with another real, paid for ZuluNumber.

Another use of ZuluNumbers is warrantees. Your ZuluNumber identified item can be used in your warrantee information with the manufacturer of the item. Once your ZuluNumber is populated with all the characteristics about the object, all you need to do to validate your warrantee is to share your ZuluNumber with the manufacturer, and you don't need to fill out cumbersome warrantee forms. Plus, the warrantee can remain with the object once it's sold, since the warrantee is part of the ZuluNumber for that object.

Mass Inventory Management

Once enough items are known through ZuluNumbers, mass storage and inventory locations could be set up with mass automation where items could live and be managed by the system. This system could also be put into service for things like Disaster Relief. For instance, what if there were an earthquake in Mexico and they were in dire need of children's clothing? People who are storing children's clothes can be contacted and asked if they would like to donate them to Disaster Relief. When they respond affirmatively, the clothing begins to work it's way to where it can help for the humanitarian cause. And the provider of the clothing can get a Tax Deductible Receipt for the replacement value of that clothing (using average selling price on eBay) to determine the value. In fact, the whole ZuluNumber system could be used in general for people to more easily donate goods and receive legitimate Tax Deductible Receipts.

Organize Your Stuff

ZuluNumber label the things you own with a pre-printed ZuluNumber or print one out for it in real time. Store pictures, video, audio annotation and other characteristics of the object in its ZuluNumber. Keep, organize, sell, donate, recycle or destroy it virtually.

DigiStore

Franchise of stores to digitize, ZuluNumber label, organize, store, appraise, sell, buy, donate, auction, recycle, dispose or rent your things. Bring in your 10-gallon bin of stuff, go shopping while your things are sorted, categorized, cleaned and get ZuluNumbers attached to them, and then return it to you when you're done shopping, along with a URL for you to view all your items online.

1800GOTVALUE?

A play on the 1800GOTJUNK company—only this time, instead of junk, you can bring a 10 gallon tub of valuable objects to a store (or have them picked up) and brought to a HIMS/HERS robot (only more industrial strength) and have all your items cataloged, put online, or a CD provided for you when you pick them up. Alternatively, you can just leave the items with the 1800GOTVALUE store, pay a little in storage, and basically have the items be put up for rent or for sale. Items can be rented to friends, friends of friends, etc. or anyone, for a fee.

ZuluNumber Storage

Before the HIS/HERS systems exist ubiquitously, and when they are still potentially expensive, a reasonable first step would be to install them at Self Storage facilities. Entire storage units could be run through the system and people could be shown online what they have in storage. Items could then be sold/rented/retrieved remotely. And the objects can be viewed and manipulated in real time using the Online Video Robotics feature.

Sell Object

When at garage sale, video/photo/audio annotation accompanies it through its ZuluNumber. Also works for donations and internationally. Get video/audio snippet with the item when you purchase it. ZuluNumbers gets 30% of the ZuluNumber transfer price.

ZuluForce

ZuluNumbers App Exchange for Salesforce—synchronize your ZuluNumber info with Salesforce. SF=People. ZuluForce=People, Places, Things.

ZuluNumber Slogan, Jingle and Gimmicks

We Give Things Lives or We Give Things Voice. Jingle—ZooooluNumba—Make it with voice and sound. Make it catchy and distinguishable. Make it more famous than AOL's "You've Got Mail". Use skywriters to put ZuluNumbers in the sky. ZuluNumbers on the North Pole with blocks of ice or a in a wheat field or even on the moon! ZuluNumber on a billboard on 101 to advertise. Put ZuluNumbers on dollar bills (like http://wheresgeorge.com) that contain links to Where's George information. Short ZuluNumber ads on radio: We ID All or We ID Everything. Use ZuluNumbers and cell phones for Performance Art (BarArt)—a palette of ZuluNumbers with a dancer/musician and cell phones linked to A/V system to produce musical pieces.

MicroRFID

In your home, place 3 RFID reader/transmitters in each room to be able to more accurately triangulate RFID location. More accurate than GPS location. Can actually track XY and Z (e.g. height as well as left-right, front-back). Your cell phone can now have sounds to help you locate the RFID you are looking for. Faster—your closer XY. Higher or lower pitch if you are too high or too low. Fast Perfect C and you're on it. Could also just have one in each room, and not have them be able to read through a wall, so at least you know you are in the correct room. Or, put really low powered ones right on the doorway between rooms where RFID ZuluNumber tagged items live so you can track when the object has left the room (and hence has been used, and when it comes back again to signal you are done using it, or if it never does, that it's still somewhere that it shouldn't be and hasn't been put back yet).

LifeCasting—Virtual TelePresence

Wearable TelePresence—JustMeTV. iPad with GoCam video camera (or just use the new iPad 2 with built-in camera), Battery backup (perhaps with Solar Panel for remote locations), Printer (to print ZuluNumbers), Skype VoIP (for real time communication), and WiFi (or satellite connection to the Internet for remote locations). The LifeCaster travels to locations (such as Thailand, Africa or Europe) and walks through local markets, souvenir shops, art stores, or any shops where local goods are sold at local prices. The entire experience is telecast in real time back to LifeCaster's home team who manages the data feed. When the LifeCaster encounters an object of interest for sale (for instance, a Persian rug or a Crystal Vase), he manipulates the object, describes it, and telecasts it back to his home team. The home team manages the data feeds, promotes the object for sale, posts it on eBay in real-time, fills in the text description of it and other data about it. Once a minimum bid or minimum price has been established, the LifeCaster engages the local shop keeper who says how much the object costs. If the minimum bid is suitably above the local price, the LifeCaster purchases it at the local price, prints and attaches a ZuluNumber to it for logistics, shipping and tracking. Back home, the bidding can continue for up to a week, and an even better profit can be made, though since the minimum bid has already been established to be sufficient to make a profit, the minimum profit is already guaranteed. The LifeCaster may engage the assistance a local interpreter or guide to help find the best stores and to negotiate with the shop keeper in the case where the minimum bid is less than the initial local price. They may also travel with an assistant to pay for the object, help carry the objects purchased, and to assist with packing and shipping the items purchased. The purchased objects could be aggregated and shipped in bulk to save money, and since they are all marked with unique ZuluNumbers, once they arrived back in the States, they could be re-shipped to get each individual object to their final destination. This could all be done with an iPad running a LifeCasting App and could be carried by college kids to defray the cost of their travels. People back home could see the world through their eyes. The LifeCaster (and his team) gets 10% of the profit, the buyer pays the shipping and any export taxes, and LifeCast (the company that runs the service) retains the difference.

RAOK.com

Random Acts Of Kindness. When a LifeCaster is in between stores, they will undoubtedly encounter beggars or people in need. The LifeCaster telecasts his or her plea. This RAOK telecast goes back to home office and the video feed is redirected to proper viewing site and audience. Any donations made from an end user gets routed and paid directly to the beggar in real time. The TeleCaster and team gets 10%, LifeCast gets 20%, the beggar gets 70%. The entire experience is captured in a ZuluNumber for future reference.

DimeForAPhoneCall

Using the LifeCast App, people could pay 10 c to talk through you to talk to someone, e.g. to ask a question or to console them. Like a "Penny for your thought". When the LifeCaster is traveling about and encountering people, someone they see may strike a chord with someone who is watching the live video feed and they will want to talk to them or give them suggestions. They can push a button on their browser, signaling that they would like to pay to talk to them through you. Using Skype Voice or Video in real-time, that remote user could talk to the person the LifeCaster has encountered, offering suggestions or advice. The entire experience is captured in a ZuluNumber for future reference.

StreamExperience—ZuluExperience

The LifeCast App can capture video at major events, e.g. Times Square on New Years Eve. A ZuluNumber is attached to the video clip to identify it. The time and location are captured with the video or images. At a later time, you can view that video or images online by viewing that ZuluNumber's web page. The experience can be download to your computer, or posted on YouTube or Facebook. The experience is always identified by its ZuluNumber, so if you make it public, anyone can view it. Or if it is categorized for Friends and Family, then only they can view it. People could even just go on nature hikes, walk in forests, in parks or on the beach, or even climb up Half Dome and those videos can be viewed by others, perhaps for a small fee that can be retained by the LifeCaster (with 30$ retained by LifeCast).

MakeMeDoIt

Using the LifeCast App, when the LifeCaster is in a foreign restaurant and is displaying some of the unusual local fare (e.g. fried insects in Burma), they can be dared to eat something they are videocasting, or to get them to do something. People can bid how much they are willing to pay them to eat or do something. Their bids are aggregated, and once the amount is sufficient, and once the LifeCaster does it, their bids are cashed in. The LifeCaster gets 70% of the amount, LifeCast retains 30%. The entire experience is given a ZuluNumber and the video associated with it for future viewing.

NoFriendsNoMore

Use the LifeCast App to link up lonely people to enjoy time together. Or even to play games with each other, like scrabble or bridge. The entire experience is captured in a ZuluNumber for future reference.

Local Mobile Shopper—YourSherpa.com

In a final example, a system can use the LifeCaster App locally rather than international, only do it for garage sales, estate sales, local store sales, or even shopping at Safeway or Local Farmer's Markets. Local teenagers could go run errands for people who aren't mobile or who don't have the time, and the entire experience can be managed with real time video. Moms could buy fresh local produce at the farmers market even though they are stuck at their kids soccer games, by tuning in to the Local Mobile Shopper who is LifeCasting the local farmer's market. And they can get exactly the tomatoes or cucumbers they want by being able to interact with the Local Mobile Shopper in real time. The entire experience is captured in a ZuluNumber for future reference.

One embodiment of Zulu Numbers includes transporting objects using Zulu Spice:

Part II

Transporting Objects Using Zulu Spice

Embodiments of the invention relate generally to object transport, and more specifically, to routing for a cooperative transfer of physical objects using a network.

PRIOR ART

Physical objects include commercial products, warehouse inventory, personal items, and the like. Currently, individuals and businesses transport physical objects from one point to another, without consideration of redundancy. However, rising gas prices, traffic density, and environmental concerns, among other circumstances, are increased. First, individuals may not be familiar with other individuals traveling a similar or overlapping route. Second, even if friends are traveling redundantly, they may be unaware of each other.

What is needed is to automatically route physical objects over nodes of a network.

DESCRIPTION

The above-mentioned needs are met by a method, system and computer program product for routing of a cooperative transfer of physical objects over a network. An object can be physical or virtual. For example, a book can be handed-off from an Internet distributor (e.g., Amazon) to social networking friends (e.g., from Facebook) for transport to a customer. In one variation, a transfer can leverage object equivalency. More specifically, a first copy of a book can be dropped-off at a first node along the route, and in response, a second copy of a book can be picked-up at a second node along the route. The following detailed description is intended to provide example implementations to one of ordinary skill in the art, and is not intended to limit the invention to the explicit disclosure, as one or ordinary skill in the art will understand that variations can be substituted that are within the scope of the invention as described.

Objects can be physical or virtual. Physical objects include, for example, commercial products, warehouse inventory, personal items, trees, pets, real estate, automobiles, mail, and the like. Virtual objects include, for example, magazine advertisements, online objects, events, experiences, dates, emotions, and the like. An object can be identified using, for example, a unique ZuluNumber.

Figure 1A:
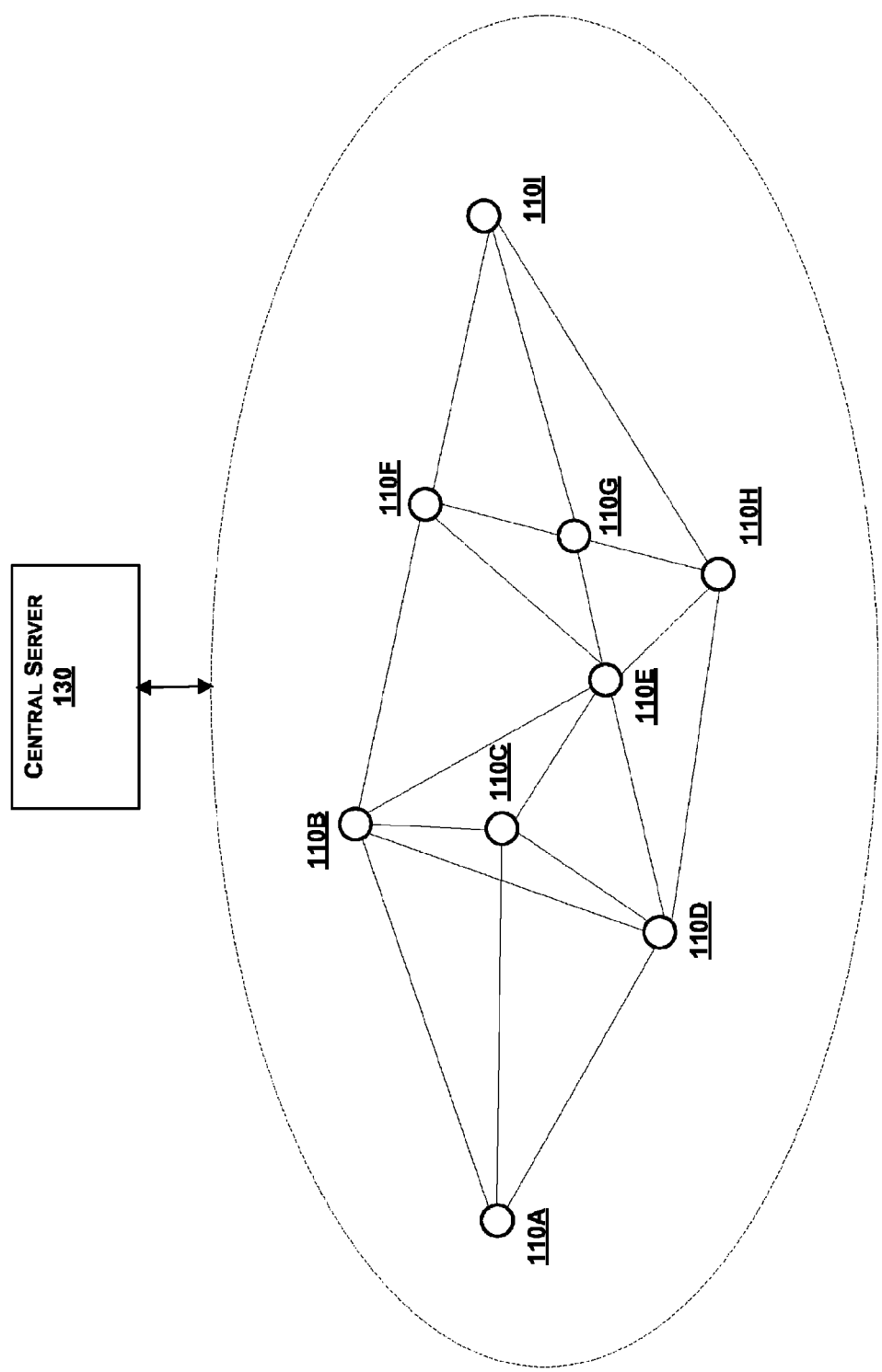
FIG. 1A is a block diagram illustrating system for routing for a cooperative transfer of physical objects over a network, according to an embodiment of the present invention.

FIG. 1A is a block diagram illustrating system 100 for routing for a cooperative transfer of physical objects over a network, according to an embodiment of the present invention. The system 100 can implement methods described in detail below.

In the embodiment shown, a central server manages object routing over the network. An object headed for a destination node 110I is dropped-off at an embankment node 110A. In between these nodes, a network of intermediary nodes 110B-110H are interconnected to provide redundant transport routes. The central server 130 communicates with all the nodes 110A-I, or just the embankment and destination nodes 110A,I, using a network such as the Internet or a cellular network. A node can be, for example, a mail box, a mail service such as UPS, Federal Express, the USPS, a store front, a home, a business, and the like. The designation of embankment and destination for nodes is relative to a particular travel route for an object and can be different for different routes.

Transport between the nodes can be accomplished using a variety of modes. Examples of transport modes includes mail, shipping, automobile, airplane, walking, bicycling, e-mail, data transport, and the like. The transport modes can be tracked in between nodes using, for example, a cellular telephone having GPS capability. In one embodiment, routing is effected by a reliability of a transport mode. In another embodiment, a trusted network of people or businesses, such as a Facebook friend or a LinkedIn contact, each contribute to the network. The nodes can include a computer or other processing device in communication with the central server.

FIG. 2A is a flow chart illustrating a method 200 for routing for a cooperative transfer of physical objects over the network, according to an embodiment of the present invention. The method 200 can be implemented in, for example, the central server of FIG. 1A.

At step 210, an object is transferred at an embankment node to a transport mode. A notification can be sent over a network to a central server. Additionally, metadata is also sent to identify the object, along with source and destination information. For example, a smart phone can scan a QR Code on an object when dropping-off. Other protocols are possible.

At step 220, a route is determined over redundant links. The routing can be affected by reliability of transport modes over links. Other routing factors can include type of transport mode, length of travel, cargo capacity, other objects being carried, and history of timeliness, among others. Routing can be performed by a central server or locally at nodes. Links connect the intermediary nodes.

In one embodiment, a Zulu Number is associated with each object being transported. A code for an embankment node and a code for a destination node can be embedded in Zulu Number associated with the object.

At step 230, the object is transferred at the intermediary nodes for transport over the links to a destination node. In one embodiment, transport over a link can be virtual. The transfer is processed using item equivalency. For example, a first copy of a book can be dropped-off at a first node, and a second copy of the book can be picked-up at a second node.

Several more detailed applications are presented below. In some embodiments, these applications can be implemented using the general architecture described above. In other embodiments, the architecture can be varied as needed.

Additional Embodiments

In one embodiment, a system (e.g., ZuluSpice) for objects to be moved from one location to another for free or almost for free, as well as for objects to be automatically stored or retrieved. E.g. Almost Free Shipping—A system where trust networks (e.g. social networking affinities) are leveraged in order for people to carry items for people that they trust. It is an extension of the concept that if you saw your neighbor walking to their car with a Blockbuster video in their hand, and you also had a Blockbuster video to return, you wouldn't feel uncomfortable asking them to return your video for you, and that they wouldn't be inconvenienced and would graciously comply. A modern day analogy to the Spice Trade Routes of the past where people and other cargo could travel along the Spice Trade Routes on ships already en route. This can be extended to the point where items can travel from one person to the next along a trusted route for virtually free, since people are already traveling that route. The "last mile" is people who are in the ZuluSpice system might periodically have to carry a bin with them to a bin drop-off point (like FedEx, USPS or DHL drop-off boxes). Bins in the ZuluSpice system are standard 10 gallon tubs with a ZuluNumber RFID tag on them. ZuluSpice drop off points can be a Postal Etceteras, Fedexes, Post Offices, places of work, Starbucks, even street corners where USPS, UPS and FedEx Mailboxes currently reside. You are identified by the fact you carry your cell phone and use the ZuluNumber App. The system knows where your cell phone is and knows you are approaching and accepts your bin. It knows where each item is destined and then calculates where each item should next go on its route. The drop off box has a version of the HIMS/HERS system in it which scans, separates and reorganizes the units into subsequent bins.

ZuluSpice leverages the ZuluNumber system where people can have their cell phones tracked for ZuluSpice to collect data about their frequently traveled paths. ZuluSpice identifies who can carry the item along the next segment of its path and notifies them that an item is ready for them to carry, where it is located, and to which destination to bring it. For every item mile that you carry a ZuluSpice item, you get a ZuluSpice Item-Mile credit. You collect credits and then you can use these credits to "buy" the delivery of an item to be delivered to you. For instance, if you regularly travel from home to work and pass by a drop-off box nearby your home, and there's a drop-off box at work, and the distance is 10 miles, then you might carry 10 items along this path and get 100 ZuluSpice Item-Miles. Then you want to buy an item on eBay that is 100 miles from you. You can have that delivered to the drop-off box near your home For Free (well, you earned the "free" shipping of this item by carrying other people's items along the path you already travel, so it was truly free for you—or at least, you would have paid for the time and gas traveled anyway). If you are unwilling to carry people's items to earn your own ZuluSpice Item-Mile credits, they can instead be purchased outright as well. They might cost 0.01 n Item-Mile. ZuluSpice charges you this amount to ship items using the ZuluSpice network.

People who are willing to move other people's items can be paid for the items they carry. For instance, a taxi driver who doesn't have any rides could ask ZuluSpice if there is anything they can carry. It can calculate a route where they can pick up and drop off the most items. They earn 0.007 an Item-Mile (ZuluSpice pockets the difference between what it charges people for a Item-Mile credit and what it pays people for them). They can then use their time to pick up and drop off items and earn money carrying other people's stuff.

ZuluSpice may need to operate its own fleet to pick up and drop off items that are taking too long to get to their end destination. Or for long distance shipping, it might need to aggregate all the items in San Jose that need to get to LA and ship them in bulk using UPS or trucks.

ZuluSpice knows the frequency of travel of all people along the route and can estimate how long it will take for the item to travel. Since the items are always being dropped off and picked up in RFID bins and at locations with HIMS/HERS, and people's cell phones are tracked, you can always know where items are located. If at any time a person wants the item to get there sooner, they can specify they would like it sooner and it can be packaged up, addressed, and a UPS or USPS truck can be dispatched for it to be picked up and sent with regular postal service and the cost would be passed on to the user.

ZuluSpice works because a lot of people will want to use it for free (moving items to and from locations where they are already traveling), and through that, and with the cost-charge arbitrage of 30%, the more items that are shipped, the more ZuluSpice makes. The incremental cost to ZuluSpice for the free users is simply the cost of all the calculations and logistics to allow them to transport the items (calculate routes, etc.).

Imagine if ZuluSpice drop-off boxes were at gas stations. People could be offered a discount on their gas in exchange for carrying a bin or two of items with them as they went along their path. If someone were to pick up 23 items in Los Banos as they gassed up and were about to drive to LA, they would be earning 0.007*23 or 16.1c a mile traveled. If gas is $4 a gallon and your car gets 25 miles per gallon, that translates to 16 cents of gas burned per mile. So basically, if they carried these items along a path they were already travelling, their gas would essentially be free! Imagine a gas station sign that read: Gas: $4.00/gallon (non ZuluSpice) or Free (with ZuluSpice) how many people would sign up! The sign could vary with number of items available to transport. For instance, if only 11 items were available to Northbound traffic, yet 23 items were available for Southbound traffic, the sign would read: Gas— $4.00 (non ZuluSpice). $2.00 (ZuluSpice Northbound) Free (ZuluSpice Southbound). ZuluSpice could in theory even pay for the gas right there for them, if it had the guarantee that the items would be traveling the full tanks' worth of gas distance. And remember, for every item moved, ZuluSpice gets a 30% slice of the transaction, since it either costs ZuluSpice nothing (if it's a ZuluSpice Item-Mile credit) or ZuluSpice got 0.01 for each Item-Mile moved.

Imagine that people could specify how to ship their items on eBay with ZuluSpice and it would be free (with ZuluSpice credits) (and ZuluSpice could estimate how long it would take, say 8 days—and some people wouldn't mind waiting, considering it's "free"), or pay for it with ZuluSpice Item-Miles (say it would have to move 20 miles, that would cost only 0.20). Or UPS—$3.95. Or in the worst case, if it's taking too long to get there, and the user decided they want it sooner than the 8 days, they could convert it to UPS and only end up having to pay for the $3.95 cost anyway. So they end up either paying the same as they would already anyway, or perhaps as little as ½0th of that cost (or less if they have ZuluSpice credits), so long as they can wait.

Item Fax

Once ZuluSpice and ZuluNumbers are widely used, a new service can be offered using the notion of "item equivalency". Basically, if you lived in New York and bought a brand new iPod that is located in LA, why should that iPod be transported across the country to you when there's an identical one in New Jersey that can be delivered within hours. This service uses "item equivalency" to basically "fax" an item to you. It works using ZuluSpice for the delivery (since ZuluSpice not only delivers items but it also has a large inventory where it knows about equivalencies) and ZuluNumbers (since each item can be uniquely identified and match equivalencies). You buy the iPod in LA and it shows up in hours! Fantastic! In the background and behind the scenes, the person/store that delivered the iPod from New Jersey is back-filled with the iPod from LA. But the end user is pleasantly surprised by the amazingly quick delivery.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Accordingly, the disclosure of the present invention is intended to be illustrative, but not limiting, of the scope of the invention.

We claim:

1. A method for object identification and enhancement, comprising:
    assigning a zulu number to uniquely identify an event or an object;
    embedding the zulu number into a machine readable format;
    receiving media from a plurality of users present at a time of the event from different locations, or users present at a location of the object at different times, the media being uploaded for storage in association with the zulu number;
    aggregating the media in a database in association with the zulu number;
    subsequently receiving the zulu number, discerned from a client automatically reading the zulu number
    accessing a database to retrieve at least a portion of the media associated with the zulu number; and
    sending the media to the client for display or for action on the media, as specified by the media or the client.

2. The method of claim 1, wherein the zulu number uniquely identifies unique instances associated with the event or the object.

3. The method of claim 1, wherein the zulu number is embedded in a QR (Quick Response) code as the machine readable format.

4. The method of claim 1, wherein the client automatically reading the zulu number comprises a smart phone or a special purpose device enabled to interpret the zulu number media.

5. The method of claim 1, wherein the media comprises at least one of: text, photographs or video.

6. The method of claim 1, further comprising:
    storing commands in association with the zulu number; and
    responsive to subsequently receiving the zulu number, executing the commands.

7. The method of claim 1, further comprising:
    responsive to subsequently receiving the zulu number, generating an entry for a transaction log.

8. The method of claim 1, wherein sending the media to the client for display comprises:
    generating a dynamic web page including a reference to the media from the plurality of users; and
    sending a reference to the dynamic web page to the client.

9. The method of claim 1, wherein:
    embedding the zulu number in a machine readable format comprises embedding the zulu number in the machine readable format in an RFID device; and
    subsequently receiving the zulu number, discerned from a client automatically reading the zulu number comprises the RFID device automatically reading the zulu number and sending the zulu number to a zulu server.

10. The method of claim 1, wherein receiving media from the plurality of users comprises:
receiving a location.

11. A non-transitory computer-readable medium storing instructions that, when executed by a processor, perform a method for object identification and enhancement, comprising:
assigning a zulu number to uniquely identify an event or an object;
embedding the zulu number into a machine readable format;
receiving media from a plurality of users present at a time of the event from different locations, or users present at a location of the object at different times, the media being uploaded for storage in association with the zulu number;
aggregating the media in a database in association with the zulu number;
subsequently receiving the zulu number, discerned from a client automatically reading the zulu number
accessing a database to retrieve at least a portion of the media associated with the zulu number; and
sending the media to the client for display or for action on the media, as specified by the media or the client.

12. A system for object identification and enhancement, comprising:
a zulu server to assign a zulu number to uniquely identify an event or an object and embed the zulu number into a machine readable format, the zulu server to receive media from a plurality of users present at a time of the event from different locations, or users present at a location of the object at different times, the media being uploaded for storage in association with the zulu number and to aggregate the media in a database in association with the zulu number; and
a client to automatically read the zulu number and send the zulu number to the zulu server,
wherein the zulu server accesses a database to retrieve at least a portion of the media associated with the zulu number and sends the media to the client,
wherein the client displays or takes action on the media, as specified by the media or the client.

* * * * *